United States Patent [19]

Heumann, Jr. et al.

[11] 3,852,500
[45] Dec. 3, 1974

[54] PRESERVATION OF CRAWFISH MEAT WITH HEPATO-PANCREATIC CRAWFISH DISTILLATE

[75] Inventors: Aubrey C. Heumann, Jr., Breaux Bridge; Wayne L. Denton; Jimmie D. Fitzpatrick, both of Lafayette, all of La.

[73] Assignee: Mr. Crawfish, Inc.

[22] Filed: Apr. 23, 1973

[21] Appl. No.: 353,736

[52] U.S. Cl.............. 426/151, 426/181, 426/227, 426/328, 426/335, 426/524, 424/106
[51] Int. Cl........................ A29c 29/00, A23p 3/34
[58] Field of Search ............ 424/110; 426/478, 382, 426/376, 321, 327, 331, 332, 386, 520, 521, 149, 523, 178, 179, 181, 182, 183, 184, 224, 227, 228, 328; 260/412.1; 424/106, 107

[56] References Cited
UNITED STATES PATENTS

| | | | |
|---|---|---|---|
| 2,176,030 | 10/1939 | Musher | 426/179 |
| 2,911,732 | 11/1959 | Webb | 426/386 |
| 3,007,802 | 11/1961 | Osakukle | 426/478 |
| 3,501,317 | 3/1970 | Veltman | 426/523 |
| 3,672,908 | 6/1972 | Hice | 426/523 |

FOREIGN PATENTS OR APPLICATIONS

| | | | |
|---|---|---|---|
| 753,794 | 8/1956 | Great Britain | 426/181 |

OTHER PUBLICATIONS

C. D. Bittenbender, "Gallic Acid Ester Antioxidants for Fish Oils," Commercial Fisheries Review, Feb. 1950, Vol. 12, No. 2.

*Primary Examiner*—Norman Yudkoff
*Assistant Examiner*—Ernest G. Therkorn
*Attorney, Agent, or Firm*—Pennie & Edmonds

[57] ABSTRACT

This invention relates to preserving the flavor of and increasing the storage life of crustacean meat. This invention is directed in particular to a process for the preservation of crawfish meat comprising heating hepato-pancreatic material of the crawfish at a temperature and pressure such as to cause continuous distillation, collecting a distillate material of about 50 to 70 percent by weight based on the initial material charge, and subjecting crawfish meat with a sufficient amount of said distillate material to allow for preservation of the meat under refrigerated conditions, and to a composition so preserved which has taste qualities substantially similar to fresh meat.

9 Claims, No Drawings

PRESERVATION OF CRAWFISH MEAT WITH HEPATO-PANCREATIC CRAWFISH DISTILLATE

BACKGROUND OF THE INVENTION

Large quantities of frozen meat obtained from crustaceans, such as crawfish, lobster, shrimp, and the like are marketed annually for human consumption. Such meat, especially crawfish, when preserved and distributed in the frozen state is regarded as decidedly inferior to the fresh product. When stored for even short periods, the frozen meat loses the characteristic color of the fresh product, becomes tough and corky, and has an inferior taste as opposed to the fresh material.

There have been various theories postulated as to the cause of this deterioration, which deterioration is believed to involve dehydration and oxidation of the meat constituents, and reaction by enzymes and bacteria on meat constituents during preservation. Many attempts have been made to provide a solution to the problem of preservation of this meat. For example, special packaging techniques have been developed and special quick-freezing techniques have been utilized. While such procedures have been found to aid somewhat in inhibiting deterioration, frozen crawfish is still found to be inferior to the fresh product as to flavor and to have a limited shelf life.

Various preservative coatings have also been applied to crawfish to prevent deterioration. This approach has not been successful due to one or more of several factors, such as an undesirable taste of the coating, inability of the coating to adhere satisfactorily to the seafood, spoiling of the coating during handling, detraction by this coating from the taste of the seafood meat, as well as other deficiencies.

SUMMARY OF THE INVENTION

A crawfish meat composition having increased shelf life under low temperature refrigeration and enhanced flavor and a method of preparing the same has now been unexpectedly found which overcomes the disadvantages heretofore encountered with such compositions.

It has now been found that compositions of crawfish meats may be formed by heating the hepato-pancreatic tissue of the crawfish to a temperature and pressure sufficient to cause continuous distillation from the tissue material, distilling and collecting from about 50 to about 70 percent by weight of the charge of the hepato-pancreatic tissue and subjecting the edible crawfish to a sufficient amount of the distillate material to preserve the meat in both taste and quality.

DETAILED DESCRIPTION OF THE INVENTION

It has now been unexpectedly found that an improved, edible crustacean seafood product can be effectively produced and protected from putrification by treating the crawfish meat with distillate material obtained from its hepato-pancreatic tissue. The meat, which is thereafter frozen, has been found to be storable for long periods of time without substantial deterioration and, upon subsequent preparation, is found to be substantially similar in palatability and flavor to a similar, fresh meat.

The method as herein described although useful for a wide variety of crustacean meats is especially useful for crawfish meat such as crawfish tails. Hereinafter the term "meat" or "seafood product" refers to the meat of crawfish.

In carrying out the invention, the liver and pancreas of the crawfish are first removed and the hepato-pancreatic distillate prepared therefrom. The hepato-pancreatic distillate which is isolated is obtained as a complex aqueous solution of substantially zero bacterial count which does not spoil under freezer storage conditions. This is contrasted with the frontal sections of the crawfish from which the liver and pancreas tissue material is obtained which, if added in toto to the crawfish tail meats, will be detrimental thereto upon storage.

The hepato-pancreatic tissue of the crawfish is distilled under conditions of temperature and pressure which will cause continuous distillation of the material, inactivates the proteolytic enzymes of the distillate material, destroys bacteria, and, therefore, produces a substantially sterilized distillate. Such conditions of temperature are about 60°C. to about 100°C. The optimum distillation temperature is about 80°C. The distillate obtained at this temperature under reduced pressure with agitation imparts superior flavor qualities. At these temperature conditions, the enzymes will be inactivated and bacteria destroyed during the period of distillation.

The pressure at which the distillation occurs can be from atmospheric pressure to a reduced atmospheric pressure wherein the combination of temperature and pressure being such as to cause a continuous distillation of the tissue material. At 100°C. the distillation of crawfish hepato-pancreatic tissue can be achieved at atmospheric pressure and at lower temperatures the distillation is achieved under correspondingly reduced atmospheric pressures. The temperature/pressure conditions being critical due to the necessity of maintaining conditions wherein continuous distillation occurs and which achieves sterilization and inactivation of the proteolytic enzyme material while maintaining flavor quality keeping characteristics of the distillate.

The distillate collected should be of such quantity as to be from about 50 to about 70 percent by weight based on the weight of the initial charge of the hepato-pancreatic tissue material. The optimum quantity being about 60 percent. The material thus collected may be kept under any reduced temperature condition range which is suitable. It has been found that such temperature should be preferably from about 10°C. to about −10°C. Lower temperatures may be used. The thus collected distillate material which is both of a preservative quality and a flavoring agent to the crawfish meat material may be stored at reduced temperatures for a prolonged period of time prior to usage in conjunction with the crawfish meat to be preserved. The distillate produced from the hepato-pancreatic tissue of crawfish is a complex chemical composition containing a multiple of components, most of which are not known. Most importantly, however, if the processing conditions set forth above are utilized, a suitable distillate is obtained.

The crawfish meat (from the tail), often separated, peeled and cleaned, is normally sorted according to size as well as to other factors which are conventional to the industry. The thus processed crawfish tails are then placed in containers, such as plastic bags, and subjected to at least 5 ml. of distillate with preferably from about 5 ml. to about 20 ml. of concentrated distillate material per pound of crawfish meat. Larger amounts of the distillate may be used to increase the flavor of the resultant meat. The addition of the distillate material may be done in a number of manners to cause the admixing of the distillate with the meat, such as by spraying the distillate material into the bag containing the crawfish meat, injecting into the bag the required amount of distillate material and then tumbling the bag and its contents to allow for an even distribution of the distillate with the crawfish tail meat. The distillate is allowed to saturate the processed tails in the bag for several minutes. The meat is then frozen in any one of a conventional number of manners, such as by air-blasting, immersion of the closed container in a reduced temperature solution, and the like. It has been found preferable that the material should be quick frozen, such as being air-blasted, at sub-zero temperatures, as this method has been found to cause less mechanical destruction of the intact cells of the meat and a more prompt prevention of the microbial growth.

Crawfish tails containing distillate material are storable for prolonged periods of time at sub-freezing temperatures.

The following examples are, therefore, disclosed for illustrative purposes only and are not meant to be limiting upon the invention concept except as set forth in the appended claims. All parts and percentages are by weight unless otherwise indicated.

EXAMPLE I

Scalded fresh crawfish were placed on a stainless steel table and the heads and tail shells were removed. During this peeling process, the hepato-pancreatic tissue found in the heads of the crawfish was removed and saved.

100 parts of the removed hepato-pancreatic tissue was subjected to simple batch distillation at a temperature of 80°C. under a reduced pressure of 0.47 atm. while the tissue material was continuously agitated during the distillation. The distillate was collected through a condenser (temperature 0° to −10°C.) into a receiver maintained at an ice-brine bath temperature of about −5°C. The distillation was continued under 60 parts of distillate was collected.

One pound of crawfish tails, which have been previously peeled, cleaned of fatty material, sorted by sizes, and placed in plastic bag containers was sprayed with a 15 ml. portion of the distillate material described above. The distillate containing crawfish tails are allowed to remain at ambient conditions for several minutes. The bag is then sealed closed and air-blasted frozen at −30°F. The processed tails were maintained frozen for at least four weeks and then defrosted, examined and tested by a taste test panel. The processed tails showed no signs of putrification and were rated substantially indistinquishable from freshly prepared crawfish tails.

EXAMPLE II

Crawfish tails were processed in a manner as described in Example I above except that the distillation was carried out at 100°C. and at one atmosphere pressure. The results were substantially the same as above.

EXAMPLE III

Crawfish tails were processed in a manner as described in Example I above except that the distillation was carried out at 65°C. at a reduced atmosphere which allowed continuous distillation. The tested crawfish tails gave substantially the same results as in Example I.

EXAMPLE IV

For comparative purposes, crawfish tails are peeled, cleaned and sorted by size. One pound of the processed tails are stored with undistilled hepato-pancreatic tissue material. When stored in a freezer in the same manner as the above examples, the samples were found to spoil in less than 6 days. A similar sample when stored at room temperature spoiled in less than four hours.

While the invention has been described in connection with a preferred embodiment, it is not intended to limit the invention to the particular form set forth, but, on the contrary, it is intended to cover such alternatives, modifications, and equivalents as may be included within the spirit and scope of the invention as defined by the appended claims.

What is claimed is:

1. A method of preserving crawfish meat comprising:
   separating the hepato-pancreatic tissue from the crawfish;
   heating the hepato-pancreatic tissue to a temperature ranging from about 60°C. to about 100°C. under a pressure which causes continuous distillation;
   collecting from about 50 to about 70 parts by weight of distillate material based on 100 parts of initial charge of hepato-pancreatic tissue; and
   treating the uncooked crustacean meat with at least 5 ml. of said distillate per pound of meat to help preserve the meat under low temperature storage.

2. The method according to claim 1 wherein the temperature is about 80°C.

3. The method of claim 1 wherein about 60 parts of distillate are collected per 100 parts of initial hepato-pancreatic tissue, said collection being done at a temperature range of about −10°C. to about +10°C.

4. The method of claim 1 wherein the crawfish meat is subjected to from about 5 ml. to about 20 ml. of distillate per pound of meat.

5. The method of claim 4 wherein the crawfish meat is subjected to about 15 ml. of distillate per pound of meat.

6. The method of claim 1 including the step of freezing the crustacean meat after treatment with the distillate.

7. A crawfish meat composition of improved properties of preservation and flavor comprising:
   uncooked crawfish meat admixed with at least 5 ml. per pound of meat of hepato-pancreatic distillate obtained by heating hepato-pancreatic tissue of the crawfish to a temperature of from about 60°C. to about 100°C. under pressure which causes continuous distillation and collecting from about 50 to about 70 parts by weight of distillate based on 100 parts of initial charge of tissue.

8. The composition of claim 7 wherein the meat contains about 15 ml. of distillate per pound of meat.

9. The composition of claim 7 in a frozen condition.

* * * * *